United States Patent
Rapp et al.

(10) Patent No.: US 8,651,129 B2
(45) Date of Patent: Feb. 18, 2014

(54) METHOD AND ARRANGEMENT FOR GENERATING OR DEPOSITING A STREAM OF FLUID SEGMENTS AND USE THEREOF

(75) Inventors: Bastian Rapp, Karlsruhe (DE); André Schumacher, Karlsruhe (DE)

(73) Assignee: Karlsruhe Institut fuer Technologie, Karlsruhe (DE)

( * ) Notice: Subject to any disclaimer, the term of this patent is extended or adjusted under 35 U.S.C. 154(b) by 183 days.

(21) Appl. No.: 13/252,066

(22) Filed: Oct. 3, 2011

(65) Prior Publication Data

US 2012/0260996 A1 Oct. 18, 2012

(30) Foreign Application Priority Data

Oct. 2, 2010 (DE) .................. 10 2010 047 384

(51) Int. Cl.
*B67D 7/72* (2010.01)
(52) U.S. Cl.
USPC ............. 137/208; 137/266; 422/504; 436/53; 436/180
(58) Field of Classification Search
USPC .............. 137/208, 255, 266; 422/502–505; 436/53, 180
See application file for complete search history.

(56) References Cited

U.S. PATENT DOCUMENTS 4,556,011 A * 12/1985 Tarr ................................ 118/46
6,274,091 B1 8/2001 Mohan et al.
2001/0053337 A1* 12/2001 Doktycz et al. ............... 422/100
2002/0153041 A1* 10/2002 Drube et al. .................. 137/208
2003/0224531 A1 12/2003 Brennen et al.
2005/0047962 A1 3/2005 Laurell et al.
2011/0030809 A1* 2/2011 Ying et al. ..................... 137/13

FOREIGN PATENT DOCUMENTS

| DE | 102007032951 A | 1/2009 |
| EP | 2052776 A1 | 4/2009 |
| WO | WO-01/73396 | 10/2001 |

OTHER PUBLICATIONS

Rapp, B.E. et al., "An indirect microfluidic flow injection analysis (FIA) system allowing diffusion free pumping of liquids by using tetradecane as intermediary liquid," Lab Chip, 9, pp. 354-356, 2009.

* cited by examiner

*Primary Examiner* — John Rivell
*Assistant Examiner* — Reinaldo Sanchez-Medina
(74) *Attorney, Agent, or Firm* — Venable LLP; Robert Kinberg

(57) ABSTRACT

An arrangement and method for generating or depositing a stream of m>1 fluid segments, respectively separated by an intermediary medium which does not mix with the fluid segments. The arrangement includes a molded body having a channel for conducting the fluid stream, from which n≥m first access lines and n second access lines branch off. The first and second access lines are configured so to be inserted into n wells. The lengths of the first access lines differ from the lengths of the second access lines, and respectively one first valve is arranged in the channel, between the branching location for each second access line and the branching location for each associated first access line, and wherein respectively a second valve is arranged in each second access line.

17 Claims, 7 Drawing Sheets

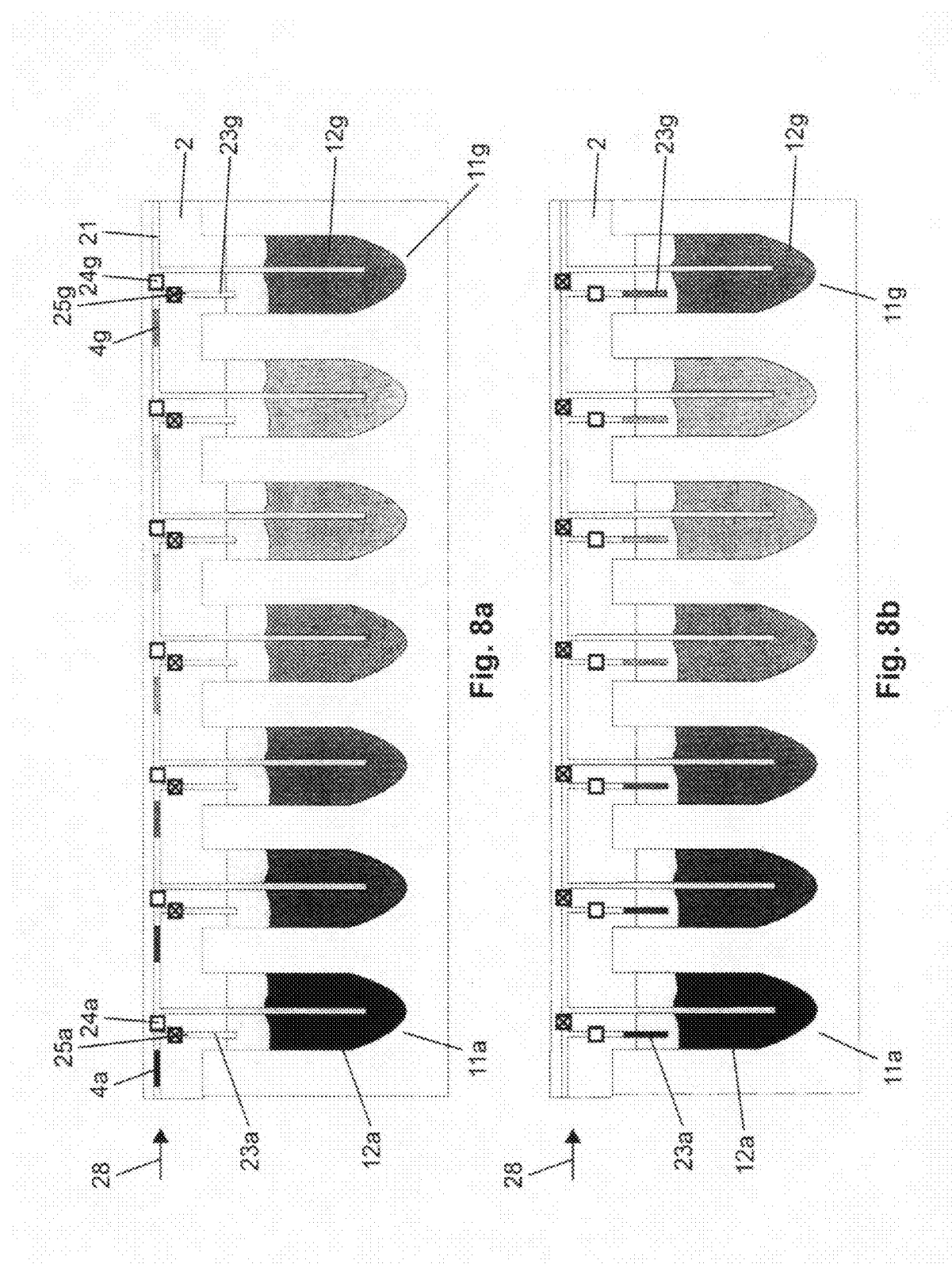

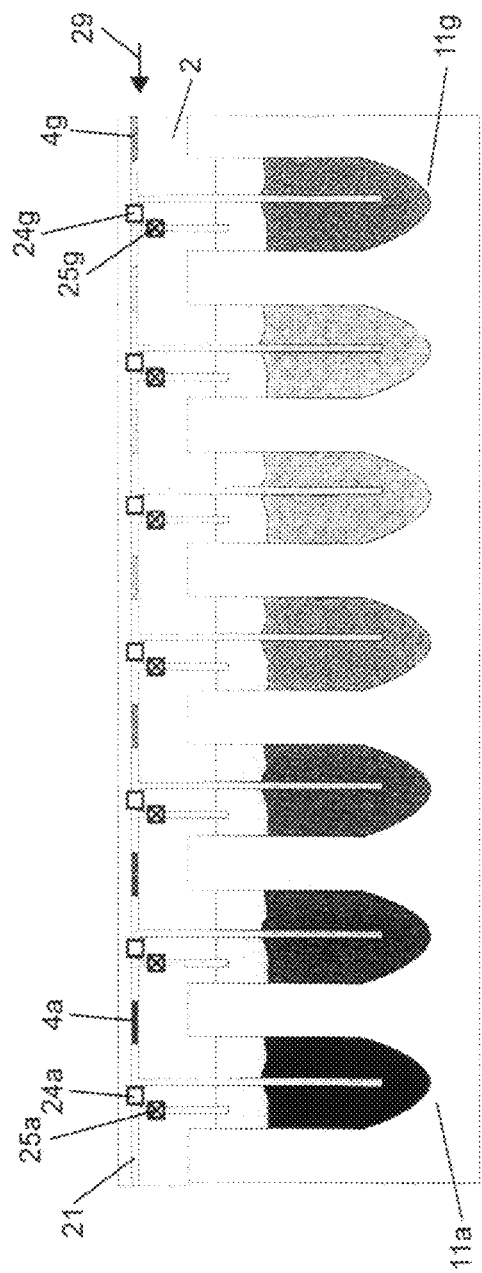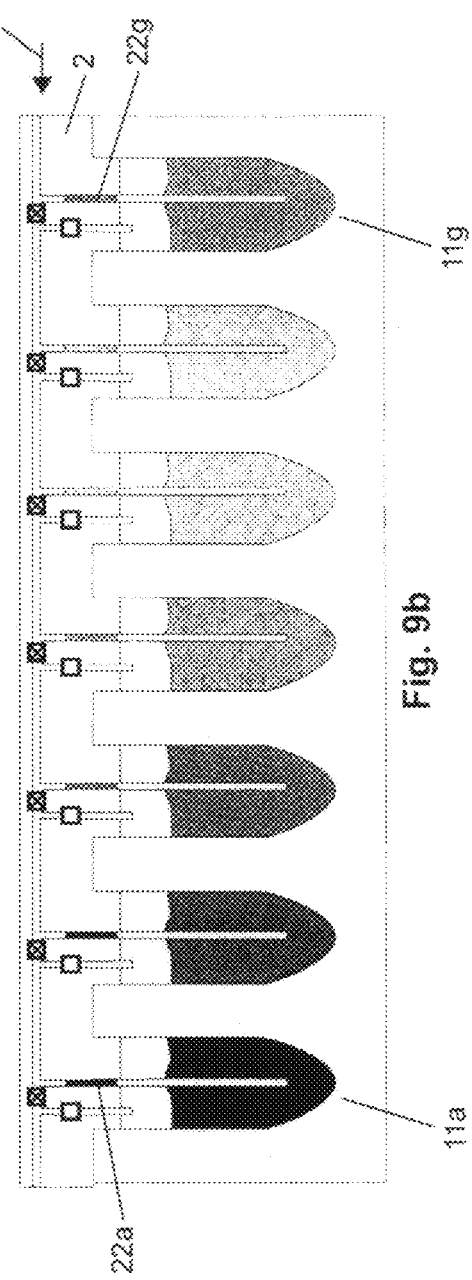

METHOD AND ARRANGEMENT FOR GENERATING OR DEPOSITING A STREAM OF FLUID SEGMENTS AND USE THEREOF

CROSS-REFERENCE TO RELATED APPLICATION

This application claims the priority of the German Patent Application DE 10 2010 047 384.7, filed on Oct. 2, 2010, the subject matter of which is incorporated herein by reference in its entirety.

BACKGROUND OF THE INVENTION

The invention relates to an arrangement and a method for generating and depositing a stream of fluid segments which are respectively separated by a intermediary medium that cannot be mixed with the fluid segments. The invention also relates to an apparatus, comprising such an arrangement, which is attached to a device for storing liquids (microtiter plate) and to the use of such an arrangement.

The question of how to adapt micro-fluidic arrangements, presently developed for use on a laboratory scale, to the microtiter plates that conform to the industrial standard is one of the biggest problems with respect to utilizing micro-fluidic arrangements in industrial-scale applications.

Microtiter plates, having measurements of 127.76 mm×85.48 mm×14.35 mm, are approximately postcard-sized components, made primarily of polymer, which contain a plurality of small depressions or wells. In the standardized form according to ANSI/SBS 1-2004, they have proven themselves as standard equipment for a plurality of uses in the life sciences and therefore represent the preferred standard systems for storing a large number of identical or different samples in liquid form in substance libraries, for example pharmaceuticals or DNA sequences. Microtiter plates are used as parallel reaction vessels in the field of combinatorial chemistry or for active agent screening. A plurality of chemical experiments can thus be realized simultaneously in the separate wells of a microtiter plate. Depending on the size of the selected plate, 6, 12, 24, 48, 96, 384 or 1536 wells serve as parallel reaction vessels. In present times, many processes realized in the pharmaceutical chemistry are no longer conceivable without the use of microtiter plates.

An extremely high throughput can be reached when using microtiter plates for screening, synthesis or analyzing processes along with standardized robotics. Since the goal of many industrial processes is the optimization of a high throughput, the use of the microtiter plate as a central component of this technology is of critical importance.

The main disadvantages of existing technologies using microtiter plates is the fact that most processes take place under ambient conditions and that the microtiter plate has a high interaction surface between the sample contained therein and the environment as a result of its opening cross section. Possible consequences include sample contamination and a danger of sample loss through evaporation. The use of robotics limits the operating speed since bulk amounts must be moved with the aid of pivoting arms or transport systems. The generated inertial forces acting upon the mechanical system during acceleration or deceleration must be compensated for or limited, to avoid an incorrect positioning or damage to the components.

Micro-fluidics represents an alternative way of achieving high throughputs with comparable processes since it permits the moving, mixing, reacting, separating and analyzing of small amounts of liquid. This takes place either in stationary devices such as micro-fluidic channels, or in micro-reaction chambers, or in active structures such as micro pumps or micro valves, thus avoiding the problem of moving bulk materials. Micro-fluidics can furthermore also integrate processing steps in addition to the pure extraction. In contrast, robotic systems frequently can be utilized only for the extraction of liquids from the microtiter plate.

Differently designed robotic systems are available from numerous manufacturers. Complete systems are often described which do not necessarily have a micro-fluidic periphery, for example as disclosed in European patent document EP 2052776 A1. The extraction process that is frequently used applies a vacuum pressure for suctioning a defined amount of liquid into a single-use tip of a vacuum pipette. Robotics permits the parallelization of this extraction process through a parallel activation of several suctioning devices. Units of the size of microtiter plates are available for the parallel extraction.

These devices have the disadvantage that they only permit the extraction of a sample, meaning the problem of connecting to the micro-fluidic devices is not solved. A further problem is that the sample is exposed completely to ambient air which can lead to contamination and/or evaporation and the resulting sample loss.

A significant disadvantage of the known micro-fluidic systems is that developments are often restricted to the use of only a single component. For example, a detector was optimized for detecting specific analyst or a pump for achieving fixed performance goals, or a chemical reaction was realized in a specific channel that is produced from a special type of material.

Equivalents to the macroscopic industrial processes were developed over the years, which in many cases made it possible to achieve comparable results with significantly reduced sample volumes. It is thus conceivable to have a reduction of expensive educts as a result of the miniaturization along with a scaling of the processes to achieve high parallelism. However, to date only a few micro-fluidic systems have actually found their way out of the laboratory to be used on an industrial scale. One of the most important reasons for this is the lack of adaptability to existing industrial systems.

Solutions have been described from time to time for connecting micro-fluidic systems to microtiter plates.

U.S. Patent Application Publication No. 2003/224531 A1 discloses a microtiter plate in which parallel reactions can take place and from which the formed products can be released with the aid of an electro-spray to a mass spectrometer. However, liquids cannot be extracted with this arrangement and, in addition, no standard microtiter plate is used but a micro-fluidic system which resembles the shape of a microtiter plate.

International patent publication WO 1/73396 A1 shows a micro-fluidic arrangement which is directly connected to a well via a capillary element that continuously pulls fluid from the well of a microtiter plate and into a micro-fluidic system. This arrangement has the disadvantage that the liquid flow and the amount of liquid to be extracted can be adjusted only with limitations and that the liquid is in contact with the environment. The arrangement is furthermore difficult to set up and control. In particular, it is difficult to extract liquid from different wells of a microtiter plate since the system is designed to be completely passive and the capillary effect cannot be easily stopped. A reverse depositing of the liquid into the well is furthermore also not possible since the direction of capillarity cannot be reversed.

U.S. Patent Application Publication No. 2005/047962 A1 describes a device capable of dispensing defined drops from a nozzle into a microtiter plate, in a manner similar to an inkjet printing head. The process is realized by applying pressure to a membrane which causes a drop to shoot out of the nozzle. The device has the disadvantage that it is suitable only for dispensing a droplet into a microtiter plate. In order to remove a droplet from the microtiter plate, it is necessary for the microtiter plate to be embodied as a nozzle plate.

U.S. Pat. No. 6,274,091 B1 describes a device using a vacuum to remove liquids from specially designed microtiter plates. For this, a microtiter plate is provided on the underside with an outlet, e.g. in the form of a nozzle, for suctioning the content out of the well. Alternatively, the well itself can be closed off and evacuated, causing the liquid to evaporate. In both cases, the volume amount to be extracted cannot be adjusted, so that the complete well is emptied in many cases. This device is furthermore not capable of dispensing liquid into a well.

A fluid exchanger is described in German patent document DE 10 2007 032 951 A1 and the article by B. E. Rapp, L. Carneiro, K. Lange and M. Rapp: "An indirect microfluidic flow injection analysis (FIA) system allowing diffusion free pumping of liquids by using tetradecane as intermediary liquid," published in Lab Chip, 9, pp 354-356, 2009, in which one liquid can be exchanged against another liquid, provided the two liquids cannot be mixed chemically. This condition can be met, for example, by using a watery phase and oil as an intermediary medium. If both liquids are filled into a vessel which is sealed airtight, a stable two-phase boundary adjusts, wherein the liquid with the lower density is at the top. By inserting two access lines into the vessel, wherein each access line is respectively in contact with one of the two phases, one liquid can be exchanged for another liquid. If an intermediary medium is fed into the associated phase via the intake connected thereto, the same volume of the watery phase flows out of the vessel through the other access line, thus exchanging the two liquids.

SUMMARY

Starting with this premise, it is an object of the present invention to provide an arrangement and a method for generating and depositing a stream of fluid segments, which are respectively separated by an intermediary medium that cannot mix with the fluid segments, thus overcoming the disadvantages and restrictions of the prior art.

An arrangement is to be made available for this which permits the direct transition between the macroscopic fluidics of a microtiter plate and the microscopic fluidics of a microfluidic arrangement. In particular, the proposed arrangement should make possible a flexible feeding in and draining out of liquid volumes between a microtiter plate and a micro-fluidic system in both directions, wherein the arrangement is compatible with the aforementioned standard for the microtiter plate, which determines the spacing of the individual wells in the microtiter plate.

The above and other objects are achieved according to the invention in which there is provided, in one embodiment, an arrangement for generating or depositing a stream of $m>1$ fluid segments which are respectively separated by an intermediary medium that does not mix with the fluid segments, comprising: a molded body including a channel to guide the fluid stream, and further including n m first access lines and n second access lines branching off at branching locations from the channel, the first and second access lines being configured to be inserted into n wells, wherein the first access lines have lengths that differ from the lengths of the second access lines, and further including respectively one first valve being installed in the channel between the branching locations of the first and second access lines, and respectively one second valve installed in each second access line.

According to a further aspect of the invention, there is additionally provided a method for generating or depositing a stream of $m>1$ fluid segments which are respectively separated by an intermediary medium that does not mix with the fluid segments, comprising utilizing the foregoing arrangement installed on a system for storing liquids in n wells.

Further embodiments of the invention relate more specifically to methods for generating a serial stream of fluid segments from fluid contained wells of, for example a microtiter plate. According to one embodiment, there is provided a method for generating a stream of fluid segments which are respectively separated by an intermediary medium that does not mix with the fluid segments and which are removed with the aid of the arrangement as described above, respectively from a first liquid phase and from a selection k of several wells n m, comprising the steps of: feeding an intermediary medium into an intake of the channel and selecting k of n wells from which respectively at least a portion of a fluid phase is transferable in a form of a fluid segment into the fluid stream while the associated first valves are closed and the associated second valves are opened thus causing a fluid segment to be pushed from the first liquid phase in the well through the associated first access line into the channel; and subsequently repeating the feeding step for each following well arranged in the channel and belonging to the selection k, until a fluid segment is extracted from all wells belonging to the selection k; and closing all n second valves and opening all n first valves and discharging the generated fluid stream from the channel.

According to a further embodiment, the feeding step includes feeding a defined volume $V_0$ of the intermediary medium through the respective second access line thus causing a fluid segment of defined volume $V_0$ to be pushed from the first liquid phase in the well through the associated first access line into the channel; and such feeding step is repeated until a fluid segment with the respective defined volume $V_0$ is extracted from all wells belong to the selection.

In another embodiment there is provided a method for depositing a stream of $m>1$ fluid segments which are respectively separated by an intermediary medium that does not mix with the fluid segments and which are deposited with the aid of the arrangement described above, into a first liquid phase, in a selection k of $n \geq m$ wells, comprising the steps of: feeding the fluid stream with the fluid segments into the channel, so that each fluid segment comes to rest in front of the second access line of the well provided for the respective fluid segment; opening of all second valves for all wells belonging to the selection k and closing of all first valves for the wells belonging to the selection k; pumping intermediary medium into an intake of the channel, causing the respective fluid segment to be pushed through the respective second access line into the associated second phase of the first well arranged in the channel from which it either rises or drops, relative to the first phase, because of the difference in density relative to the intermediary medium; and repeating of the pumping step for all wells belonging to the selection k.

According to yet a further embodiment, there is provided a method for depositing a stream of $m>1$ fluid segments which are respectively separated by an intermediary medium that does not mix with the fluid segments and which are respectively deposited with the aid of the arrangement described above, into a first liquid phase in a selection k of several $n \geq m$ wells, comprising the steps of: guiding the stream with the fluid segments in the channel so that each fluid segment comes to rest behind the first access line belonging to the well that is provided for the respective fluid segment; opening of all second valves for all wells belonging to the selection k and closing of all first valves for all wells belonging to the selection k; pumping of intermediary medium into an outlet of the channel, thus causing the respective fluid segment to be pushed through the respective first access line into the associated first phase; and repeating of the pumping step for all wells belonging to the selection k.

The principle of the parallel-to-serial conversion is known from the field of electronic circuitry, wherein the circuits used can generate a serial flow of data from an incoming parallel flow of data, for example for transmitting to an interface or vice versa. The present invention transfers this principle to the exchange of liquids (fluids) between a microtiter plate and a micro-fluidic device. The invention thus uses fluid that is stored in parallel-arranged containers, for example including several side-by-side arranged vessels or several wells in a microtiter plate, to form a serial fluid stream or vice versa. For this operation, a fluid amount is removed from each storage container and is supplied to a serial flow, consisting of a sequence of individual fluid segments separated by an intermediary medium. Vice versa, a serial flow which consists of a sequence of individual fluid segments that are separated by an intermediary medium can also be transferred to a row of storage vessels.

The arrangement (converter) according to the invention for generating or depositing a fluid stream of m>1 fluid segments, respectively separated by an intermediary medium which does not mix with the fluid segments is a molded body, preferably composed of polymer, metal, ceramic, glass or silicon and provided with at least one elongated, micro-fluidic channel (extraction channel) disposed therein. The channel is determined to be sufficiently long to connect the individual depressions (wells) of a microtiter plate. However, the channel is not directly in contact with the wells. Rather, for each well two side channels, referred to herein as access lines, with respectively different lengths, branch off from the main channel, wherein these side channels extend in the plane for the channel and, in the final analysis, empty vertically into the individual wells of the microtiter plate. In one embodiment the access lines may extend in three spatial directions so that they have a specific volume or a minimum or maximum length.

The access lines may be structurally embodied as tube segments, nozzles or sleeves or the like, either inside a body or in the form of separate bodies. Every second access line between the channel and the associated well of the microtiter plate in this case can respectively be closed off with a second valve which can be activated via an external control signal. A first valve is furthermore arranged inside the channel for each individual well, between the outflow of the respective first access line and the respective second access line, wherein this first valve can close off the channel between the two access lines (outflows).

The individual wells of the microtiter plate are closed off airtight against the converter, for example with a sealing element such as an O-ring or, if the converter itself is composed of soft polymer, this polymer may functions as a sealing element against the wells once a light pressure is applied. In another embodiment of the system, the wells of the microtiter plate may be sealed against the converter with the aid of material-to-material connections, for example with the aid of adhesive.

According to the invention, the converter together with the microtiter plate forms a closed system which provides the individual wells with respectively two access lines to the converter. Apart from these two access lines, the well is closed off airtight. In the initial state, a second liquid or gaseous volume (air segment) is still located between the surface of the first liquid phase in the respective wells and the converter, wherein this volume can differ depending on the liquid level of the first liquid phase in the respective well. The volume amount for the second phase (air segments) is of no importance for the function of the converter.

According to a further embodiment, the converter is provided with more than one channel, thereby making it possible to generate not only one, but also several serial fluid streams which can be conducted via several inflow and outflow lines into or out of the converter.

According to another embodiment, the channel (extraction channel) may be configured so that it simultaneously functions as micro-fluidic channel for a micro-fluidic system. This may be realized by using additional structural components such as valves, pumps, sensors or the like in the channel.

For one embodiment, the two individual complementary valves belonging to one well may be realized in a single structural component.

According to another embodiment, a fixed switching pattern is defined, for example for activating all wells of a microtiter plate, a row of wells, or a well gap and/or subgroups thereof.

The associated methods for generating or depositing fluid segments are explained in further detail below.

The arrangement according to the invention can be used in particular as connecting device between a micro-fluidic channel and a microtiter plate, thus solving the initially stated problem of connecting devices from the field of micro-fluidics to microtiter plates based on the industrial standard ANSI/SBS 1-2004.

BRIEF DESCRIPTION OF THE DRAWINGS

These and other features and advantages of the invention will be further understood from the following detailed description with reference to the accompanying drawings.

FIGS. 8*a* and 8*b* illustrate the mode of operation for depositing fluid segments, respectively separated by an intermediary medium, into wells of a microtiter plate.

FIGS. 9*a* and 9*b* illustrate an alternative mode of operation for depositing fluid segments, which are respectively separated by an intermediary medium, into wells of a microtiter plate.

DETAILED DESCRIPTION

Converter and Microtiter Plate

Figure 1A:
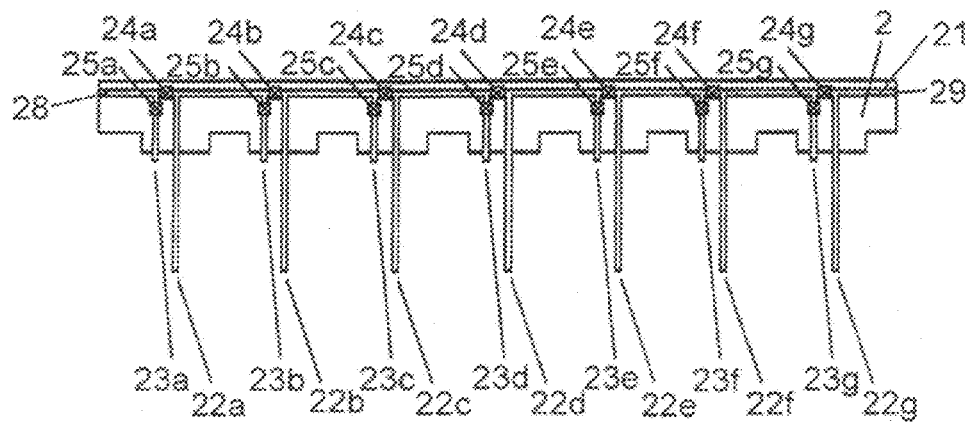
FIG. 1a is a schematic section through an arrangement, referred to herein as a converter, for generating or depositing a stream of fluid segments.
Figure 1B:
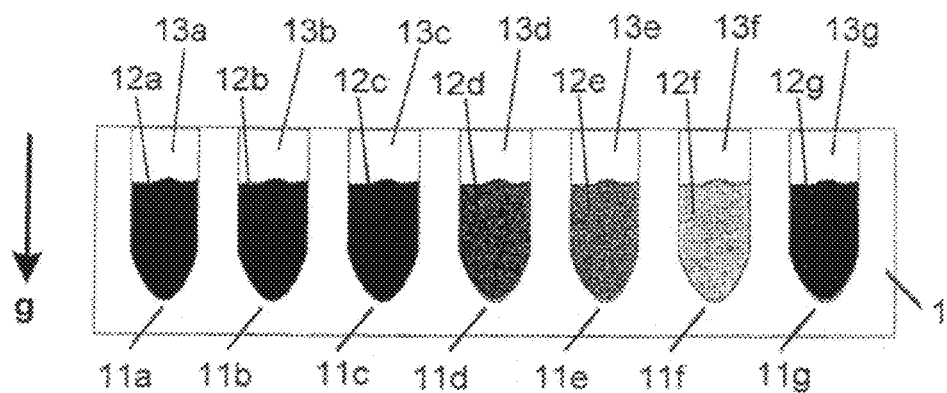
FIG. 1b is an equipment piece for storing liquids, for example a microtiter plate.

FIG. 1*a* schematically shows a section through an arrangement, referred to herein as a converter 2, which may be a molded body, for generating or depositing a stream of fluid segments. The converter comprises a channel 21, also referred to as an extraction channel, with an inflow line 28 and an outflow line 29. From the channel 21, 2×n access lines extend outward, meaning n first access lines 22*a*-22*g* and n second access lines 23*a*-23*g*, wherein for this exemplary embodiment the first access lines 22*a*-22*g* are longer than the second access lines 23*a*-23*g*. The spacing between the access lines is fixed such that the lines can be inserted into n depressions, or wells, 11*a*-11*g* of a device, such as a microtiter plate 1, for storing liquids as shown in FIG. 1*b*. Respectively one first externally switched valve 24*a*-24*g* is installed in the channel 21, between the branching location of each of the n second access lines 23*a*-23*g* and the branching locations for each associated first access line 22*a*-22*g*, while respectively one second externally switched valve 25*a*-25*g* is installed in each of the n second access lines 23*a*-23*g*, thus capable of closing off selected ones of the n second access lines 23*a*-23*g* with respect to the extraction channel 21.

The converter 2 may comprise, for example, the soft polymer material polydimethylsiloxane (PDMS) and is embodied such that it can individually seal each well 11*a*-11*g* of a selected microtiter plate 1 and such that it will fit only the aforementioned respectively two access lines onto a well. The individual wells 11*a*-11*g* of the microtiter plate 1 in this case are sealed airtight against the converter 2, owing to the fact that the polymer functions as a sealing element against the wells 11*a*-11*g*.

FIG. 1*b* schematically shows a section through a device for storing liquids, such as a microtiter plate 1. This exemplary embodiment is not intended to specify the size of the microtiter plate 1 and the number of wells 11*a*-11*g* or the composition and the volume of the first liquid phase 12*a*-12*g* that is kept ready in the wells 11*a*-11*g*.

FIG. 1*b* shows an exemplary embodiment of a microtiter plate 1 with seven wells 11*a*-11*g*, wherein each well contains a liquid 12*a*-12*g* with a different composition. For this exemplary embodiment, the available liquid volumes 12*a*-12*g* are identical while the composition of each is different. This type of embodiment, however, is not absolutely required for the function of the arrangement according to the invention.

Arrangement Consisting of Converter and Microtiter Plate

Figure 2:
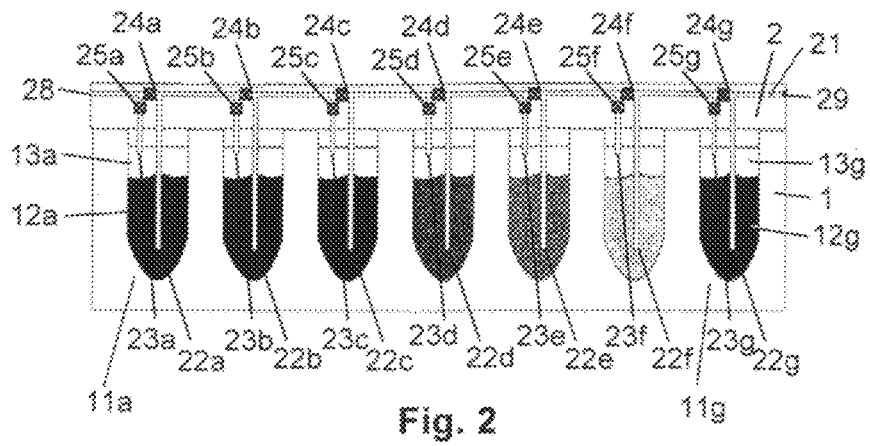
FIG. 2 is a section through a converter affixed to a microtiter plate, wherein an intermediary medium is used which has a lower density than the first liquid phases in the wells of the microtiter plate.

FIG. 2 shows that the converter 2 according to the invention, which is embodied as micro-fluidic component, is affixed to the microtiter plate 1 and forms a closed system together with the microtiter plate 1 which provides the individual wells 11*a*-11*g* with respectively two access lines 22*a*-22*g*, 23*a*-23*g* to the converter 2. Apart from the two access lines 22*a*-22*g*, 23*a*-23*g*, each well 11*a*-11*g* is sealed airtight.

In the initial state, a second gaseous phase (air segment) 13*a*-13*g* is still located between the converter 2 and the respective surface of the first liquid phases 12*a*-12*g* in the respective wells 11*a*-11*g*, wherein the volume of this gaseous phase depends on the respective liquid level of the first liquid phases 12*a*-12*g* in the respective wells 11*a*-11*g* and the volume size is not important to the function of the converter.

Whereas an intermediary medium 3 is used in FIG. 2 which has a lower density than the first liquid phases 12*a*-12*g* in the wells 11*a*-11*g* of the microtiter plate 1, the intermediary medium 3 used in FIG. 3 has a higher density than the first liquid phases 12*a*-12*g* in the wells 11*a*-11*g* of the microtiter plate 1. The arrow given the reference g in this case indicates the direction of the gravitation vector.

Figure 3A:
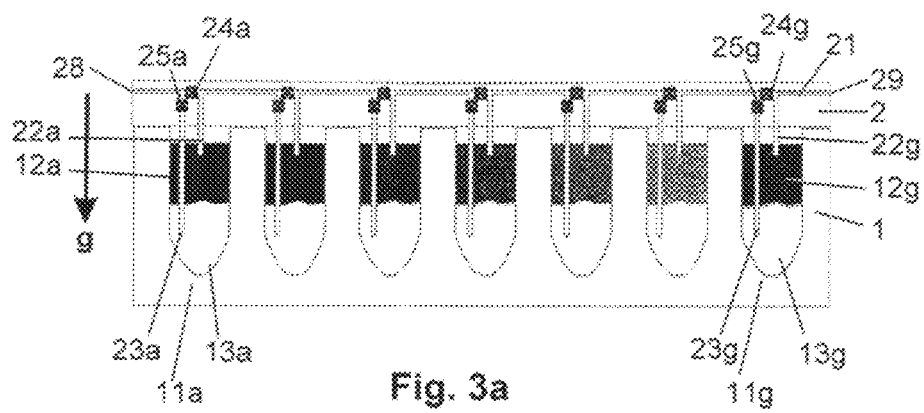
FIG. 3a is section through a converter affixed to on a microtiter plate with an intermediary medium having a higher density than the first liquid phases in the wells of the microtiter plate.

FIG. 3*a* shows that in the initial state, the first liquid phases 12*a*-12*g* in the respective wells 11*a*-11*g* are therefore arranged above the associated second phases 13*a*-13*g*. According to this exemplary embodiment and in contrast to FIG. 2, it is therefore necessary that the first access lines 22*a*-22*g* to the first liquid phases 12*a*-12*g* are shorter than the second access lines 23*a*-22*g* to the second phases 13*a*-13*g*.

Figure 3B:
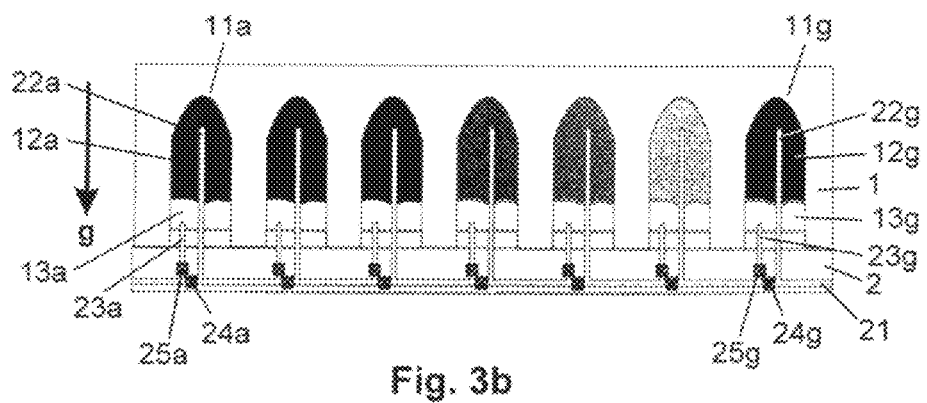
FIG. 3b is a section through a converter affixed to a microtiter plate which is reversed, as compared to the arrangement, in relation to the direction of gravity.

According to an alternative embodiment shown in FIG. 3*b*), the arrangement can be reversed, relative to the direction of gravity, as compared to FIG. 2. For this embodiment and in contrast to FIG. 3*a*, the first access lines 22*a*-22*g* to the first liquid phases 12*a*-12*g* are longer than the second access lines 23*a*-23*g* to the second phases 13*a*-13*g*, as in FIG. 2.

Evacuation of the Converter for the Operation

Figure 4:
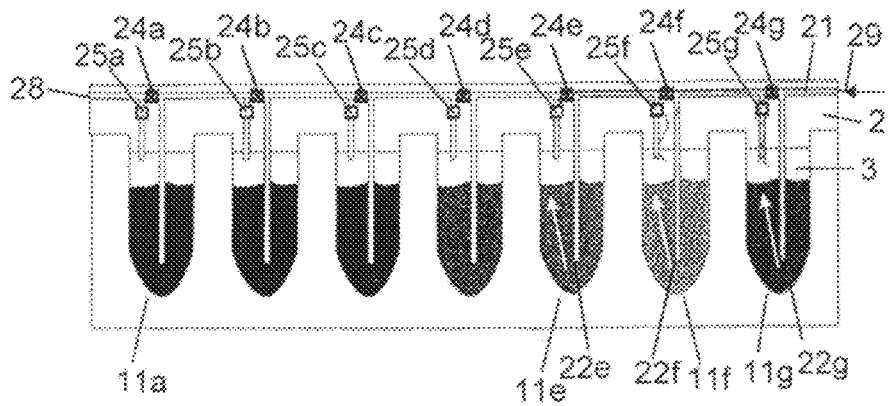
FIG. 4 is a view from the side showing an evacuation of the arrangement consisting of converter and microtiter plate.

To transfer the first liquid phases 12*a*-12*g* from the microtiter plate 1 with the converter 2 into a serial sequence of fluid segments 4*a*-4*g*, the second valves 25*a*-25*g* are initially opened, as shown in FIG. 4, while the first valves 24*a*-24*g* remain closed. Intermediary medium 3, which in this case has a lower density than the first liquid phases 12*a*-12*g* in the wells 11*a*-11*g* of the microtiter plate 1, is then introduced via the channel 21. For this, the intermediary medium 3 is pumped through the output line 29 of the converter 2 continuously into the channel 21 of the converter 2, using an externally arranged pump (not shown herein). By switching the valves, the intermediary medium 3 is initially conducted into the first access line 22*g* of the well 11*g* and thus into the well 11*g* where it rises to the top because of its lower density, thereby continuously displacing the second gaseous phase (air) 13*g* from the well 11*g*. The air travels through the second access line 23*g* of the last well 11*g* once more into the channel 21 where it flows through the first access line 22*f* of the next to the last well 11*f* into the well 11*f*.

This operation continues sequentially through all wells 11*g*-11*a* until it reaches the inflow line 28 of the channel 21 for the converter 2. The wells are gradually filled in this way from the back (well 11*g*) toward the front (well 11*a*) with intermediary medium 3 and the air is displaced from the individual wells 11*g*-11*a*. FIG. 4 shows the case where the wells 11*g* and 11*f* have already been evacuated while the well 11*e* is next in line.

Figure 5:
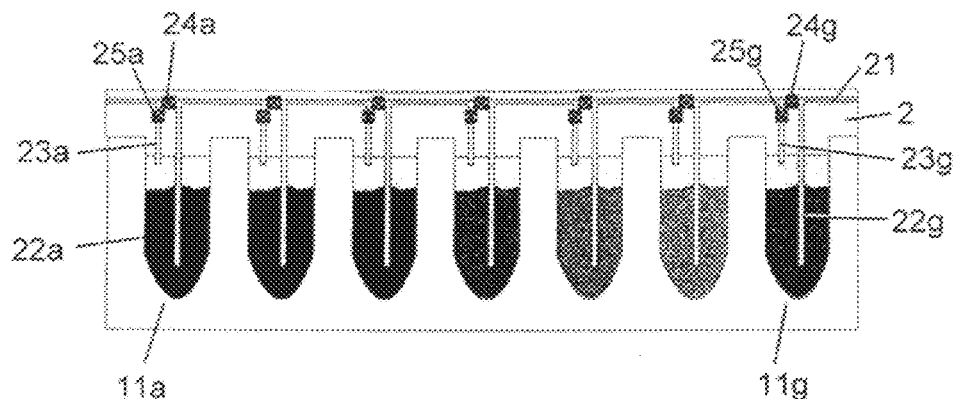
FIG. 5 is a view from the side of a completely evacuated arrangement consisting of the converter and the microtiter plate.

FIG. 5 shows that the process is continued until all wells 11*g*-11*a* have been evacuated completely. In this state, only the first liquid phases 12*a*-12*g* and the intermediary medium 3 are located in the wells; the access lines 22*a*-22*b* and 23*a*-23*b* which respectively lead to the wells 11*a*-11*g* and the channel 21 are completely filled with intermediary medium 3. Following this, all valves 24*a*-24*g*, 25*a*-25*g* are closed.

Carrying Out the Parallel-to-Serial Conversion

In the evacuated state, the converter 2 is ready for carrying out the parallel-to-serial conversion for which a sequential sample stream of liquid segments 4*a*-4*g* with respectively defined volume is generated from the first liquid phases 12*a*-

12g present inside the respective well 11a-11g. With the aid of a complementary activation of the valves 24a-24g, 25a-25g, it can be selected whether or not a segment is to be extracted from the respective well 11a-11g.

The term complementary in this case is understood to mean that the respectively other valve must assume the opposite switching state: If a first valve 24x, x=a to g is opened, then the associated second valve 25x must be closed and/or vice versa.

The two complementary valves 24x, 25x in that case should never occupy the same switching state.

If a first valve 24x is opened, wherein the associated second valve 25x is closed, the corresponding well 11x does not participate in the parallel-to-serial conversion. In the opposite case, if a first valve 24x is closed, wherein the associated second valve 25x is opened, the respective well 11x participates in the parallel-to-serial conversion.

Figure 6:
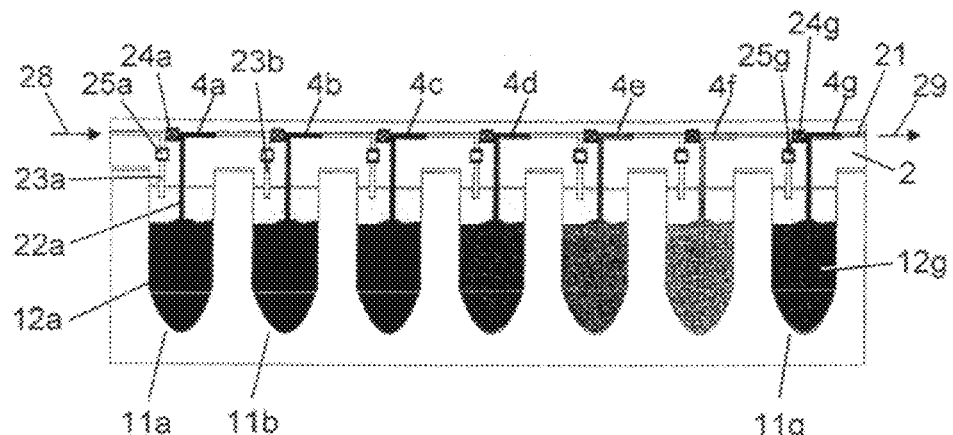
FIG. 6 is a section through an arrangement a converter and a microtiter plate, showing the formation of a fluid stream.

FIG. 6 shows the case where all the wells participate in the conversion operation. In general, however, only k of n wells 11x are selected from which at least a portion of the stored first liquid phase 12x is to be transferred in the form of a fluid segment 4x to the fluid stream.

The above-described action, in particular, can also be processed sequentially during the course of several passages, wherein the selection of wells and the volume extracted in each case can differ for each passage.

According to FIG. 6, all first valves 24x are closed and all second valves 25x are opened. A defined volume segment of the intermediary medium 3 then flows with a fixed speed into the intake line 28 of the converter 2. The fed-in volume segment is guided through the second access line 23a of the first well 11a into the second phase 13a where it pushes out an identically large segment of the first liquid phase 12a present in the well 11a through the first access line 22a into the channel 21. In the process, it displaces the identical volume of intermediary medium 3 from the extraction channel 21 into the second access line 23b of the following well 11b where the above-described sequence is repeated. In this way, a sample stream is generated in the extraction channel 21 which consists of the segments 4a-4g, embedded in the intermediary medium 3, of the first liquid phases that were present in the respective wells 11a-11g.

The volume of the segments 4a-4g is determined by the volume of the liquid segment which is initially fed through the intake 28 into the converter 2 and is precisely computed using the volume of this liquid segment minus the volumes of the participating first access lines 22a-22g in the wells 11a-11g. Since the volume segment for this exemplary embodiment is displaced by pushing it through all the wells 11a-11g, the extracted liquid volumes are the same for all wells 11a-11g. If individual wells are excluded from the conversion as a result of the inversion of the valve switching states, the volume segment in the extraction channel remains unchanged and thus continues to consist of intermediary medium 3. Fluid segments 4x with different volumes can be produced through serial connection of several conversion operations.

Figure 7:
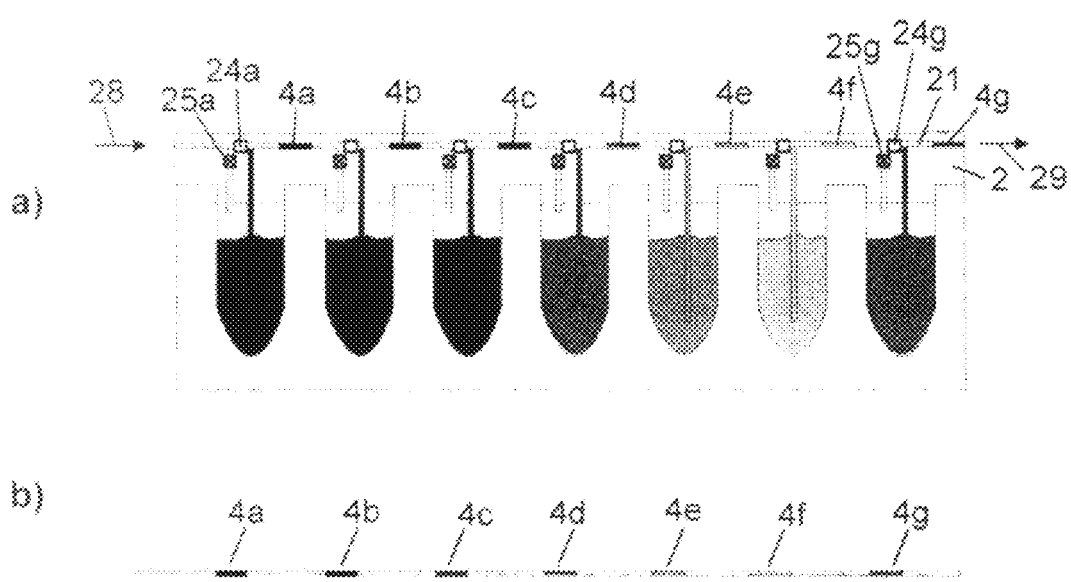
FIG. 7a shows a section through an arrangement of a converter and a microtiter plate following the forming of the fluid stream.
FIG. 7b is a diagram showing the fluid stream composed of extracted fluid segments.

In the last conversion step, shown in FIG. 7a, the stream of fluid segments 4a-4g generated in the channel is conveyed out of the discharge line 29 of the converter 2 by continuously pumping intermediary medium 3 into the intake line 28 of the converter 2. All second valves 25a-25g are closed for this while all first valves 24a-24g are opened. The sequential stream of fluid segments 4a-4g, shown in FIG. 7b, is then supplied to a micro-fluidic system or is directly utilized further.

Carrying Out the Serial-to-Parallel Conversion

FIGS. 8a, 8b, and 9a, 9b illustrate two alternative processes for depositing the segments 4a-4g of a fluid stream, respectively separated by an intermediary medium 3, into the depressions (wells) 11a-11g.

According to FIG. 8a, with the first valves 24x open and the second valves 25x closed, the stream carrying the fluid segments 4a-4g is guided such that the fluid segments inside the channel 21 come to rest in front of the respective second access line 23x belonging to the well 11x, which is provided for the respective fluid segment 4x, x=a-g. The first valves 24x belonging to the respective well 11x are then closed while the second valves 25x are opened. By pumping intermediary medium 3 through the intake line 28 into the channel 21, the respective fluid segment 4x is conveyed through the second access line 23x (see FIG. 8b) into the associated second phase 13x where it either rises or drops, based on the difference in the density to the intermediary medium 3 of the respectively first phase 12x.

According to an alternative embodiment illustrated in FIGS. 9a, 9b, again with the first valves 24x open and the second valves 25x closed, the stream containing the fluid segments is again guided such that the fluid segments 4a-4g come to rest in the channel 21, behind the first access line 22x belonging to the well 11x which is provided for the respective fluid segment 4x, x=a-g. The first valves 24x belonging to the respective well 11x are then closed while the second valves 25x are opened. By pumping intermediary medium 3 through the output line 29 into the channel 21, the respective fluid segment 4x is conveyed through the associated first access line 22x into the respective well 11x.

In general, however, k of n wells 11x are selected into which respectively at least one fluid segment 4x from the fluid stream is to be placed.

The above-described operation in particular can also be processed sequentially during several passes, wherein the selection of wells can differ for each pass.

In either of the alternative embodiments of FIGS. 8a, 8b and 9a, 9b, the fluid segment stream in channel 21 may be generated by guiding a volume of intermediary medium through a selected second access line into the associated second phase in the respective well, so that the intermediary medium displaces the same volume of associated first liquid phase through the associated first channel from the respective well into the channel.

Prototype Layout

Figure 10:
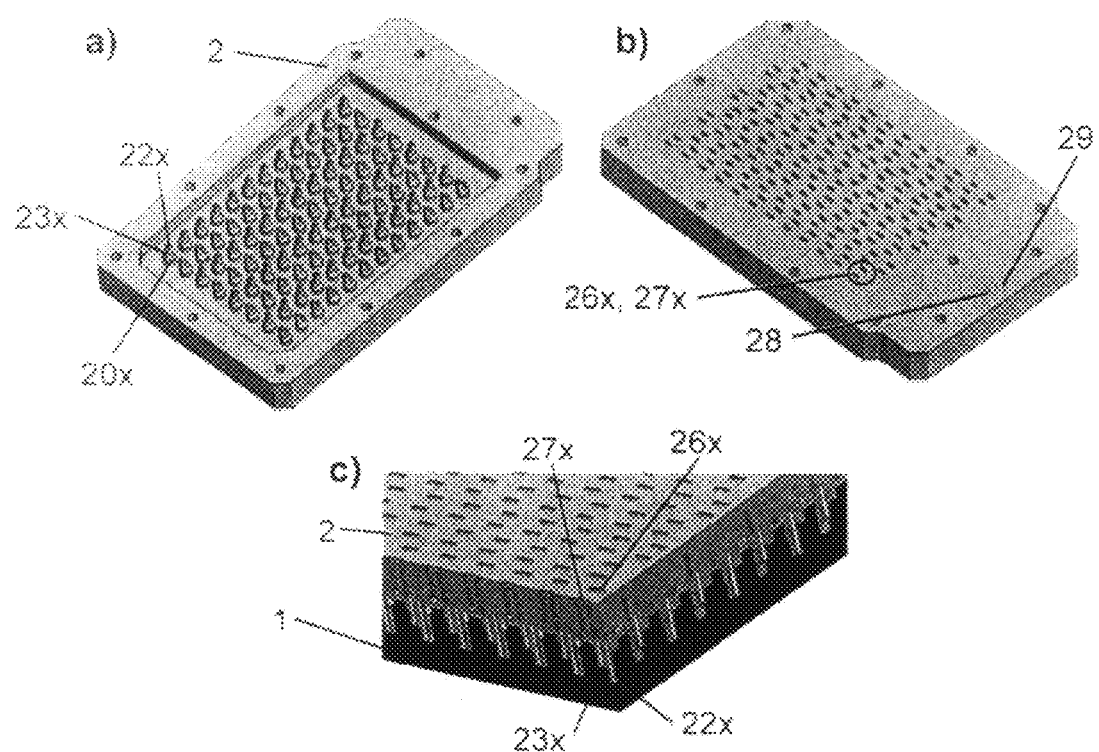
FIGS. 10*a* and 10*b* show a 96-well converter as seen from below from above, respectively.
FIG. 10*c* shows a section through an arrangement consisting of a 96-well converter that is arranged on a 96-well microtiter plate.

A prototype of a 96-well parallel-to-serial converter is illustrated in FIGS. 10a, 10b and 10c. This component was modeled in 3D-CAD and produced with the aid of stereolithography. The micro-fluidic channel is designed to be on the inside, with small rectangular openings serving as locations where the valves are fitted onto the top of the component. The valves, in particular membrane valves, are fitted onto these openings together with a corresponding actuator. Also visible are the intake line and the output line which are also modeled as inside-positioned channels.

FIG. 10a) represents a view from below of the converter 2. Visible are the nozzles 20x, which carry the long first access lines 22x and the short second access lines 23x.

FIG. 10b) provides a view from above of the converter 2, wherein the intake line 28 and the output line 29 extending from the channel 21 are visible, along with the regions where the connecting locations 26x, 27x for the first two valves are located. Not visible is the channel 21 which extends on the inside of the component.

FIG. 10c) shows a section through an arrangement which comprises a converter 2 that is fitted onto a microtiter plate 1. Visible once more are the contact locations 26x, 27x for the first and the second valves as well as the long, first inflow lines 22x and the short second inflow lines 23x.

According to an alternative configuration, the arrangement is embodied such that no inside-positioned channels are required. The structural part in that case can be embodied as a polymer component which can technically be replicated, preferably taking the form of an injection-molded part.

The invention has been described in detail with respect to various embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed:

1. An arrangement for generating or depositing a stream of m>1 fluid segments which are respectively separated by an intermediary medium that does not mix with the fluid segments, comprising:
    a molded body including a channel to guide the fluid stream, and further including n≥m first access lines and n second access lines branching off at branching locations from the channel, a pair of the first and second access lines being configured to be inserted into each of the n wells, wherein the first access lines have lengths that differ from the lengths of the second access lines, and further including respectively one first valve being installed in the channel between the branching locations of the first and second access lines of each pair of first and second access lines, and respectively one second valve installed in each second access line.

2. A method for generating a stream of fluid segments which are respectively separated by an intermediary medium that does not mix with the fluid segments and which are removed with the aid of an arrangement as disclosed in claim 1, respectively from a first liquid phase and from a selection k of several wells n≥m, comprising the steps of:
    feeding an intermediary medium into an intake of the channel and selecting k of n wells from which respectively at least a portion of the fluid phase is transferable in a form of a fluid segment into the fluid stream while the associated first valves are closed and the associated second valves are opened thus causing the fluid segment to be pushed from the first liquid phase in the well through the associated first liquid phase in the well through the associated first access line into the channel;
    subsequently repeating the feeding step until a respective fluid segment is extracted from all wells belonging to the selection k; and
    closing all n second valves and opening all n first valves and discharging the generated fluid stream from the channel.

3. The method according to claim 2, wherein:
    the feeding step comprises feeding a defined volume $V_0$ of the intermediary medium through the respective second access line for the wells thus causing a fluid segment of the defined volume $V_0$ to be pushed from the first liquid phase in the well through the associated first access line into the channel; and
    the step of subsequently repeating comprises subsequently repeating the feeding step until a fluid segment with the respective defined volume $V_0$ is extracted from all wells belonging to the selection k.

4. The method according to claim 3, wherein the second phase comprises the intermediary medium or the second phase comprises a different fluid which cannot be mixed with the first phase and the intermediary medium which are respectively present in the wells.

5. The method according to claim 2, wherein the second phase comprises the intermediary medium or the second phase comprises a different fluid which cannot be mixed with the first phase and the intermediary medium which are respectively present in the wells.

6. The method according to claim 2, wherein prior to the step of feeding the intermediary medium into the intake of the channel, closing the first valves of a selection k of n≥m wells and opening the second values of the selected k wells, and evacuating a gaseous phase from the selected k wells by guiding intermediary medium through the first access lines of the selected k wells into the associated first phase in the respective well, so that the gaseous phase is displaced through the second access lines into the channel and replaced with intermediary medium.

7. A method for depositing a stream of m>1 fluid segments which are respectively separated by an intermediary medium that does not mix with the fluid segments and which are deposited with the aid of an arrangement according to claim 1, into a first liquid phase, in a selection k of n≥m wells, comprising the steps of:
    feeding the fluid stream with the fluid segments into the channel, so that each fluid segment comes to rest in front of the second access line of the well provided for the respective fluid segment;
    opening of all second valves for all wells belonging to the selection k and closing of all first valves for the wells belonging to the selection k;
    pumping intermediary medium into an intake of the channel, causing the respective fluid segment to be pushed through the respective second access line into the associated second phase of the first well arranged in the channel from which it either rises or drops, relative to the first phase, because of the difference in density relative to the intermediary medium; and
    repeating of the pumping step for all wells belonging to the selection k.

8. The method according to claim 7, further comprising, prior to the feeding step, guiding a volume of intermediary medium through a selected second access line into the associated second phase in the respective well, so that the intermediary medium displaces the same volume of associated first liquid phase through the associated first channel from the respective well into the channel.

9. The method according to claim 7, wherein the second phase comprises the intermediary medium or the second phase comprises a different fluid which cannot be mixed with the first phase and the intermediary medium which are respectively present in the wells.

10. A method for depositing a stream of m>1 fluid segments which are respectively separated by an intermediary medium that does not mix with the fluid segments and which are respectively deposited with the aid of an arrangement as disclosed in claim 1, into a first liquid phase in a selection k of several n≥m wells, comprising the steps of:
    feeding the stream with the fluid segments into the channel so that each fluid segment comes to rest behind the first access line belonging to the well that is provided for the respective fluid segment;
    opening of all second valves for all wells belonging to the selection k and closing of all first valves for all wells belonging to the selection k;

pumping of intermediary medium into an outlet of the channel, thus causing the respective fluid segment to be pushed through the respective first access line into the associated first phase; and repeating of the pumping step for all wells belonging to the selection k.

11. The method according to claim 10, further comprising, prior to the feeding step, guiding a volume of intermediary medium through a selected second access line into the associated second phase in the respective well, so that the intermediary medium displaces the same volume of associated first liquid phase through the associated first channel from the respective well into the channel.

12. The method according to claim 10, wherein the second phase comprises the intermediary medium or the second phase comprises a different fluid which cannot be mixed with the first phase and the intermediary medium which are respectively present in the wells.

13. The arrangement according to claim 1, wherein the n first access lines and the n second access lines branch off from the channel so that the n first access lines can respectively be inserted into a first liquid phase located in one of the n wells and that the n second access lines can respectively be introduced into a second phase that is arranged above or below the first liquid phase.

14. The arrangement according to claim 1, wherein the arrangement is adapted to be connected with an external device to move the fluid segments and the intermediary medium.

15. A method for generating or depositing a stream of $m>1$ fluid segments which are respectively separated by an intermediary medium that does not mix with the fluid segments, comprising utilizing the arrangement according to claim 1 installed on a system for storing liquids in n wells.

16. A method for generating or depositing a stream of $m>1$ fluid segments which are respectively separated by an intermediary medium that does not mix with the fluid segments, comprising utilizing the arrangement as disclosed in claim 1 connected to a microtiter plate.

17. A system for storing liquids in $n \geq m$ wells, comprising the apparatus according to claim 1 for generating or depositing a stream of $m>1$ fluid segments which are respectively separated by an intermediary medium that does not mix with the fluid segments.

* * * * *